No. 610,709. Patented Sept. 13, 1898.
E. HILBERG.
STERILIZING APPARATUS.
(Application filed Jan. 25, 1896.)
(No Model.)
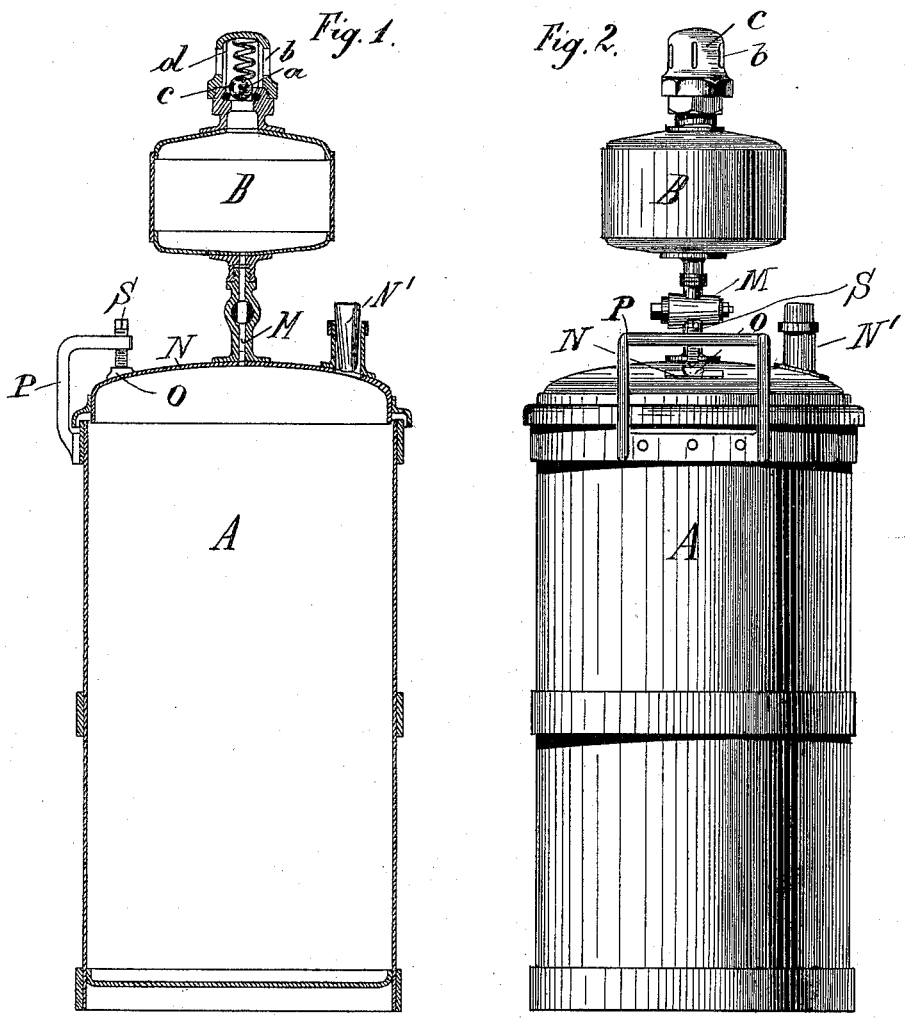

UNITED STATES PATENT OFFICE.

EMIL HILBERG, OF ESSEN-ON-THE-RUHR, GERMANY.

STERILIZING APPARATUS.

SPECIFICATION forming part of Letters Patent No. 610,709, dated September 13, 1898.

Application filed January 25, 1896. Serial No. 576,801. (No model.) Patented in Germany September 27, 1894, No. 86,518; in England August 28, 1895, No. 16,145, and in Switzerland September 5, 1895, No. 11,150.

*To all whom it may concern:*

Be it known that I, EMIL HILBERG, chemist, a subject of the King of Prussia, German Emperor, and a resident of Essen-on-the-Ruhr, Märkischestrasse 54, in the Kingdom of Prussia and Empire of Germany, have invented a certain new and useful improved apparatus for the treatment of milk, bouillon, and the like to produce an entirely germ-free and transportable alimentary product, (for which patents have been granted in Germany, No. 86,518, dated September 27, 1894; in Great Britain, No. 16,145, dated August 28, 1895, and in Switzerland, No. 11,150, dated September 5, 1895,) of which the following is a specification.

This invention has for its object an improved apparatus for the treatment of milk, bouillon, or the like to produce an entirely germ-free and transportable alimentary product which undergoes no alteration as regards digestibility, natural appearance, color, or taste as against fresh milk, bouillon, or the like.

A product entirely free from germs can only be obtained by fractional sterilization in a current of steam, the vessel and the article to be sterilized requiring to have the air entirely excluded. It is thus a main condition that the sterilizing vessel or apparatus shall be intermittently opened or closed at a suitable moment. An absolutely-transportable product can only be obtained by subjecting the sterilized fluid to a pressure sufficiently great to fix the separate fat particles in the serum in such a way that their rising and collecting on the surface (the so-called "buttering") does not take place even during a long transportation.

In order that during the sterilization the product shall not lose the digestibility, natural appearance, color, or taste of the unsterilized product, the limit of temperature—that is to say, a given maximum degree of heat—must not be exceeded. In any case by the first sterilization and at this maximum degree of heat the destruction of all bacteria does not take place. This latter is attained by the fractional sterilization. What has hitherto been described as fractional sterilization is only to be regarded as a preliminary and subsequent sterilization.

The sterilizing apparatuses hitherto employed have the drawback that they are not applicable for transportation, because the shutting off or expulsion of the air does not take place at the suitable moment.

The fractional sterilization is effected for the purpose of this invention in the following manner: The portable or transporting vessel, which is provided with a tight cover, is tightly connected with an overflow vessel, which again is provided with an automatic stopper or closing device—such, for instance, as a ball-valve of suitable construction standing under the pressure of a spring. After the transporting vessel has been entirely filled with the product which is to be sterilized the filling-opening is closed and the overflow vessel also partially filled with the milk or the like which is to be sterilized, and then the transporting vessel is heated in a current of steam. The milk or the like then expands and rises in the overflow vessel, which is placed above. By the steam developed by the heating of the milk the air in the overflow vessel is compressed and a given excess pressure in the interior of the sterilizing vessel is produced. If the temperature exceeds the admissible limit, the pressure also of course increases in the vessel, the automatic joint of the latter opens or expands, and the resulting gases escape. After the sterilization has been carried on for a given time by simply heating the sterilizing vessel in a current of steam the sterilizing vessel is removed from the sterilizing-chamber, cooled down, and allowed to stand a certain time. Owing to a cooling and setting of the liquid taking place and to the condensation of the vapor contained in the overflow vessel a vacuum is produced in the overflow vessel which causes any particles of air which may still be contained in the liquid to rise up into it. As all the bacteria are not killed at the necessary sterilization temperature of about 102° to 103° centigrade, because a very much greater temperature and one which burns milk is necessary for killing the very resistant spores of the potato bacillus, it results that the process must be carried out in another way in order to kill or neutralize existing spores in such a way that any germination of the same and deleterious action is entirely excluded. This is only attainable by simply heating the sterilizing vessel in a current of steam alternating with sudden cooling, as by the cooling the undeveloped spores are further developed and are then killed or rendered harmless by the subsequent sterilization. This process is repeated several times without atmospheric air entering the apparatus itself. When the sterilization is completed, the apparatus is cooled down to that temperature which produces the maximum density of the liquid, and in case of milk amounts to about 4° centigrade, according to the quantity of fat contained in the milk. When a cooling down to this temperature has taken place, the transporting vessel is closed and the overflow vessel is removed therefrom. When the sterilized cooled liquid has reached the normal temperature, such a pressure is produced by the tension of the liquid in the interior of the vessel as is necessary to allow of its being conveyed. The inner pressure may, however, be produced in another manner than by the cooling down of the liquid to that temperature which produces the maximum density—namely, by closing, for instance, the partly-raised cover of the sterilizing vessel down farther into the interior of the vessel by screws inserted in overhanging brackets secured to the wall of the same, and thus increasing the volume of the contents and producing the requisite pressure.

My invention consists in the construction of sterilizing apparatus hereinafter described.

In order that my invention may be fully understood, I will proceed to describe it with reference to the accompanying drawings, in which—

Figure 1 is a longitudinal section on the line $e\,f\,g$, Fig. 3; Fig. 2, a side view, and Fig. 3 a plan view, of the apparatus.

The transporting vessel A is provided with a removable adjustable cover N, in which a filling-orifice N' is arranged.

O are projections on the cover, providing seats for pressure-screws S, adjustable in brackets P, secured to the walls of the vessel. On the cover is a cock M, on which an overflow vessel B is air-tightly placed. The overflow vessel itself is provided at its upper part with an automatic closing device, which in the case shown in the drawings consists of a ball-valve $a$, kept closed by the pressure of a spring. A cap $c$, provided with openings $b$, is placed over the ball-valve, and this cap has ridges $d$ in its interior for guiding the ball-valve.

What I claim, and desire to secure by Letters Patent of the United States, is—

1. A sterilizing apparatus, comprising a transporting vessel having a pressure-cover provided with a filling-opening and a stop-cock, an overflow vessel having a valve closing automatically against pressure and secured to the stop-cock, and means for seating the cover; substantially as described.

2. A sterilizing apparatus comprising a transporting vessel having a pressure-cover provided with a filling-opening and a stop-cock, the overhanging brackets secured to the transporting vessel, the pressure-screws adjustable in the brackets, the overflow vessel secured to the stop-cock and having an automatic device closing against pressure, consisting of a ball-valve, a cap provided with ridges and with openings, and a spring located between the ball and the cap; substantially as described.

EMIL HILBERG.

Witnesses:
PAUL SOLUCK,
ANTON LIPPERT.